United States Patent
Gui et al.

(10) Patent No.: US 6,373,658 B2
(45) Date of Patent: Apr. 16, 2002

(54) OPTIMUM LOCATION FOR SLIDER LANDING PADS

(75) Inventors: Jing Gui, Fremont; Huan Tang, Cupertino, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/272,820

(22) Filed: Mar. 19, 1999

Related U.S. Application Data (60) Provisional application No. 60/078,629, filed on Mar. 19, 1998.

(51) Int. Cl.$^7$ .................................................. G11B 5/48
(52) U.S. Cl. ................................................... 360/234.1
(58) Field of Search .............................. 360/237, 234.1, 360/234.6, 234.8, 234.9, 235.4, 235.5, 235.6, 237.1, 234.2, 235.9, 235.8, 235.7, 236.1, 236.2, 236.3, 236.4, 236.5, 236.6; 369/105, 106, 102, 107, 109

(56) References Cited

U.S. PATENT DOCUMENTS

| | | | | |
|---|---|---|---|---|
| 4,896,233 | A | * 1/1990 | Yamada | 360/104 |
| 5,267,104 | A | * 11/1993 | Albrecht et al. | 360/97.02 |
| 5,499,149 | A | * 3/1996 | Dovek | 360/234.1 |
| 5,768,055 | A | * 6/1998 | Tian et al. | 360/103 |
| 5,777,825 | A | * 7/1998 | Dorius | 360/103 |
| 5,796,551 | A | * 8/1998 | Samuelson | 360/103 |
| 5,872,686 | A | * 2/1999 | Dorius et al. | 360/103 |
| 5,889,635 | A | * 3/1999 | Sato | 360/234.1 |
| 5,991,120 | A | * 11/1999 | Sato | 360/246.2 |
| 6,040,958 | A | * 3/2000 | Yamamoto et al. | 360/103 |
| 6,188,547 | B1 | * 2/2001 | Gui et al. | 360/236.5 |
| 6,212,042 | B1 | * 4/2001 | Gui et al. | 360/236.6 |
| 2001/0013994 | A1 | * 8/2001 | Tokisue et al. | 360/236.3 |

FOREIGN PATENT DOCUMENTS

| | | | |
|---|---|---|---|
| JP | 10-3628 | * | 1/1998 |
| JP | 11-66784 | * | 3/1999 |
| JP | 11-86257 | * | 3/1999 |
| JP | 11-144414 | * | 5/1999 |

OTHER PUBLICATIONS

Y.Kasamatsu et al, Stiction Free Slider for Smooth Surface Disk, 11/95, IEEE Transaction on Magnetics, V.31 No. 6, pp. 2961–29063.*

* cited by examiner

Primary Examiner—William Klimowicz
Assistant Examiner—Tianjie Chen
(74) Attorney, Agent, or Firm—Merchant & Gould

(57) ABSTRACT

A disk drive system or information handling system includes a base, a disk stack rotatably attached to the base, and an actuator assembly movably attached to the base. An actuator assembly is movably attached to the base of the disk drive. The actuator assembly moves the load springs and attached slider and transducers to various radial positions on the disk. The slider is a block of material having a leading edge, a trailing edge, a first side rail, a second side rail, a leading tapered edge and a center island. The center island is positioned near the trailing edge and includes the read and write heads or transducer. Sliders have a backside surface and an air-bearing surface. The slider also has one or more pads positioned near the edges of the first rail, the second rail, and the leading tapered edge. The pads are positioned at least a selected distance from the trailing edge. The pads are also positioned such that they are unaligned in the sliding direction. The pads are also positioned so that they are unaligned in the sliding direction when the first side rail and the second side rail form an angle with respect to a tangent at the radial position on the disk. In other words, the pads are unaligned when the slider is skewed with respect to the disk. The pads are formed using photolithography techniques.

20 Claims, 5 Drawing Sheets

OPTIMUM LOCATION FOR SLIDER LANDING PADS

PROVISIONAL APPLICATION

This application claims the benefit of U.S. Provisional Application Ser. No. 60/078,629, filed Mar. 19, 1998 under 35 U.S.C. 119(e).

CROSS-REFERENCE TO RELATED APPLICATIONS

This application is related to copending and commonly-assigned U.S. patent application Ser. No. 09/250,453, entitled "APPARATUS, SYSTEM, AND METHOD FOR OPTIMIZING THE DESIGN OF SLIDER PROTRUSIONS IN A HARD DISC DRIVE SYSTEM", filed Feb. 16, 1999, by Thomas R. Pitchford, et al., which application is incorporated by reference herein.

FIELD OF THE INVENTION

The present invention relates to the field of mass storage devices. More particularly, this invention relates to a slider for use in a disk drive which includes landing pads for minimizing stiction and wear for the slider.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk-, or write information representing data to the disk. When the disk is operating, the disk is usually spinning at relatively high RPM. These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 12 microinches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

Disk drives have actuator assemblies which are used to position the slider and transducer at desired positions with respect to the disk. The slider is attached to the arm of the actuator assembly. A cantilevered spring, known as a load spring, is typically attached to the actuator arm of a disk drive. The slider is attached to the other end of the load spring. A flexure is attached to the load spring and to the slider. The flexure allows the slider to pitch and roll so that the slider can accommodate various differences in tolerance and remain in close proximity to the disk. The slider has an air-bearing surface ("ABS") which includes rails and a cavity between the rails. The air-bearing surface is that portion of the slider that is nearest the disk as the disk drive is operating. When the disk rotates, air is dragged between the rails and the disk surface causing pressure, which forces the head away from the disk. At the same time, the air rushing past the depression in the airbearing surface produces a negative pressure area at the depression. The negative pressure or suction counteracts the pressure produced at the rails. The different forces produced counteract and ultimately the slider flies over the surface of the disk at a particular fly height. The fly height is the thickness of the air lubrication film or the distance between the disk surface and the head. This film eliminates the friction and resulting wear that would occur if the transducing head and disk were in mechanical contact during disk rotation.

One of the most critical times during the operation of a disk drive is just before the disk drive shuts down. The small ceramic block is typically flying over the disk at a very low height when shutdown occurs. The slider is typically moved to a non-data area of the disk where it literally landed and skidded to a stop on the disk surface. Disk drives that park the slider on a non-data area of the disks have problems. The problem is static friction which is also known as stiction. In the past, the non-data area of the disk was textured or otherwise roughened so that there would be less chance of stiction between the slider and the disk. In some instances, lasers were used to form specific textures at the landing areas of the disk.

Currently disk drives use smooth disk surfaces. In other words, the disk is not textured at any location. Stiction problems increase when using the smooth disks. When the sliders are parked on the smooth surface of the disk, stiction results between the slider, a small ceramic block, and the disk surface. In some instances, the stiction forces are large enough to virtually rip the slider away from the load spring to which the slider is attached. In order to lessen the problems associated with stiction between the disk and the slider, pads have been provided on the air bearing surface. In a paper by Y. Kasamatsu, T. Yamanoto, S. Yoneoka, and Y. Mizoshita, IEEE Transactions on Magnetics, Volume 3 1, page 296 1, issued in 1995, a design using three pads is disclosed. One pad is located near the center pad. The second pad is located on the center of the outside rail. The third pad is located on the center of the inside rail. The disadvantage of this design is that one pad is located near the center pad which houses the read/write transducer such that it may interfere with the normal operation of the read/write head. In other words, the pad near the center pad may alter the flying height of the read/write head and therefore alter the performance of the head. It is well known that the closer the read/write head is to the magnetic recording surface, the better the magnetic performance. Placing a pad near the center pad may result in an increased flying height.

Another disadvantage associated with this design is that there is no consideration of placing the pads to minimize stiction forces. Head-disk interface stiction arises mainly for menisci formed at the contact points between the slider and the disk. The magnitude of this force is proportional to the total area of the meniscus and the pressure within the meniscus which is inversely proportional to the separation between the slider and the disk. When a pad is placed in the center of a rail, a full circle meniscus is formed which allows a full stiction force to be formed at that particular point.

As can be seen, there is a need for a slider having pads placed thereon to minimized any stiction forces that occur. In addition, there is a need for a slider that minimizes stiction overall between the slider and the disk. In addition, there is a need for a slider design that uses pads which do not interfere with the normal operation of the read/write head or transducer associated with the slider. There is still a further need for a robust design that can absorb some of the impact that might occur when the slider lands on the disk. There is still a further need for a slider that can undergo multiple starts and stops of the disk drive without failing over the life of the disk drive.

SUMMARY OF THE INVENTION

A disk drive system or information handling system includes a base, a disk stack rotatably attached to the base, and an actuator assembly movably attached to the base. An actuator assembly is movably attached to the base of the disk drive. The actuator assembly moves the load springs and attached slider and transducers to various radial positions on the disk. The slider is a block of material having a leading edge, a trailing edge, a first side rail, a second side rail, a leading tapered edge and a center island. The center island is positioned near the trailing edge and includes the read and write heads or transducer. Sliders have a backside surface and an air-bearing surface. The slider also has one or more pads positioned near the edges of the first rail, the second rail, and the leading tapered edge. The pads are positioned at least a selected distance from the trailing edge. The pads are also positioned such that they are unaligned in the sliding direction. The pads are also positioned so that they are unaligned in the sliding direction when the first side rail and the second side rail form an angle with respect to a tangent at the radial position on the disk. In other words, the pads are unaligned when the slider is skewed with respect to the disk. The pads are formed using photolithography techniques.

Advantageously, the pads are placed on the air-bearing surface of the slider to minimized any stiction forces that occur. The placement of the pads produces a slider that minimizes stiction overall between the slider and the disk. The pads do not interfere with the normal operation of the read/write head or transducer associated with the slider since the pads are offset a selected distance from the trailing edge of the slider. The pads are also unaligned in the sliding direction so that the lubricant on the disk can fill in between successive passes of the slider over a track. The pads are also unaligned in the sliding direction when the slider is skewed with respect to the disk. The end result is a slider that can undergo multiple contact start/stops without failing prematurely. The slider is also easily manufactured using photolithography techniques and the slider is robust and can absorb some of the impact that occurs when the slider lands on the disk.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
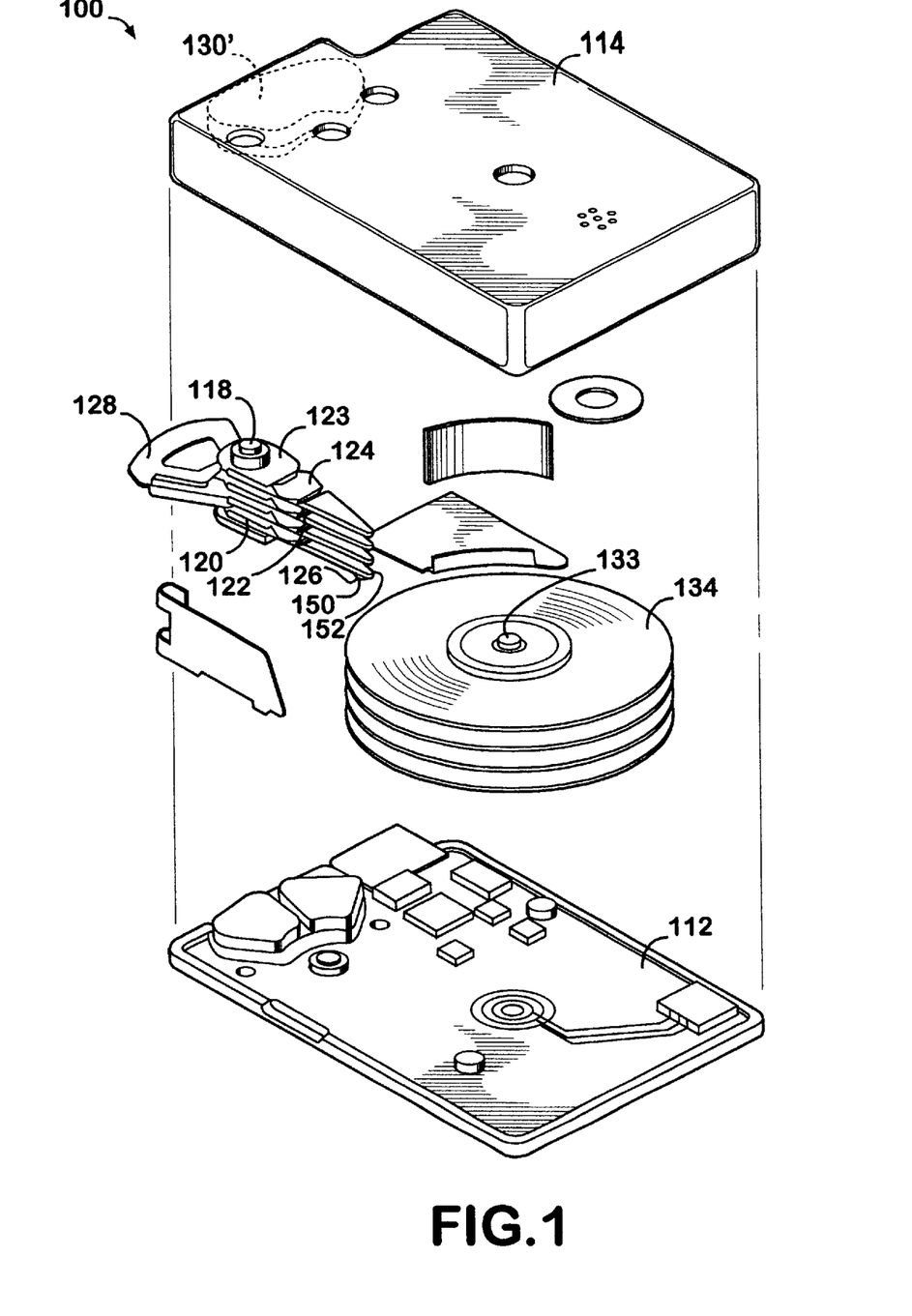
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing or base 112, and a cover 114. The base 112 and cover 114 form a disk enclosure. Rotatably attached to the base 112 on an actuator shaft 118 is an actuator assembly 120. The actuator assembly 120 includes a comb like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the other end of the actuator arm assembly 120 opposite the load springs 124 and the sliders 126 is a voice coil 128.

Attached within the base 112 is a pair of magnets 130 and 130'. The pair of magnets 130 and 130', and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disk drive, the spindle motor is within the hub. In FIG. 1, a number of disks 134 are attached to the spindle hub 133. In other disk drives a single disk or a different number of disks may be attached to the hub. The invention described herein is equally applicable to such other disk drives.

Figure 2:
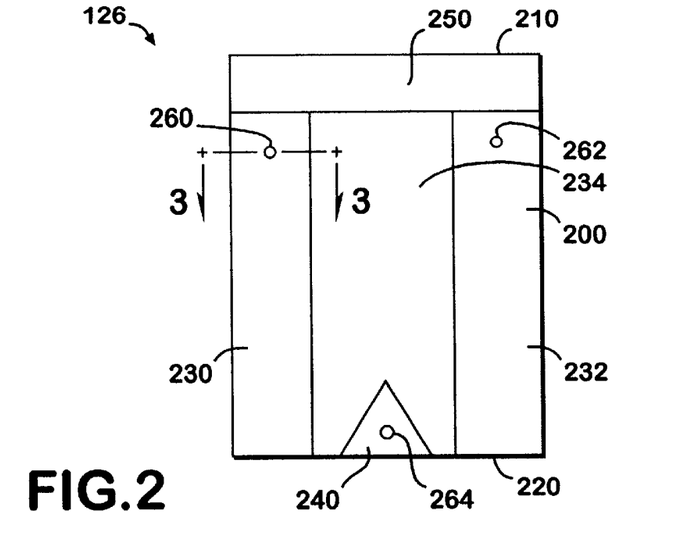
FIG. 2 is a bottom view of the slider which shows the air-bearing surface.

FIG. 2 is a bottom view of a slider 126. The slider 126 includes an air-bearing surface 200, a leading edge 210 and a trailing edge 220. The air-bearing surface 200 is the portion of the slider 126 which is most close to the disk 134, while the slider 126 is in transducing position. The bottom view shown in FIG. 2 of the slider 126 shows the air-bearing surface 200. The air-bearing surface 200 includes a first side rail 230, a second side rail 232 and a center pad or center island 240. The transducing head 240 is positioned near the trailing edge 220 and in the center island 240. The air-bearing surface 200 also includes a tapered leading edge 250. A cavity 234 is formed between the tapered leading edge 250, the first side rail 230, and the second side rail 232.

The air-bearing surface 200 also includes a pad 260, pad 262 and a pad 264. The pads are positioned as suggested by the paper to Y. Kasamtsu which is mentioned in the background of the invention section of this document. The pad 260 is centered on the first side rail 230 near the leading edge 210. The second pad 262 is centered on the second side rail 232 near the leading edge 210. The last pad is located on the center pad 240 near the trailing edge 220 of the slider 126. Each of the pads 260, 262 and 264 are formed by removing a portion of the ceramic material which comprises the slider 126. The pads are formed by conventional photolithography techniques. The areas of the pads are masked and the mask is then removed on the other areas of the slider. The unmasked area can then be etched to remove a portion of the ceramic. Finally, the mask associated with the pads 260, 262 and 264 are removed, therefore leaving a structure with a pad 260 centered on the first rail 230, the pad 262 centered on the second side rail 232 and the third pad 264 which is centered on the center rail 240.

Figure 3:
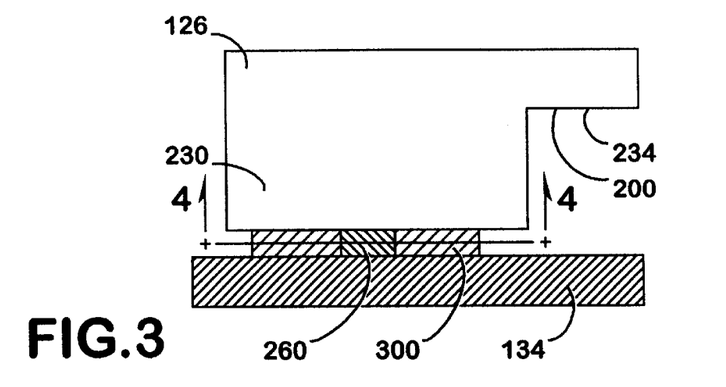
FIG. 3 is a cutaway end view of a side rail of a slider having a pad located in the middle of the side rail along line 3—3 of FIG. 2.
Figure 4:
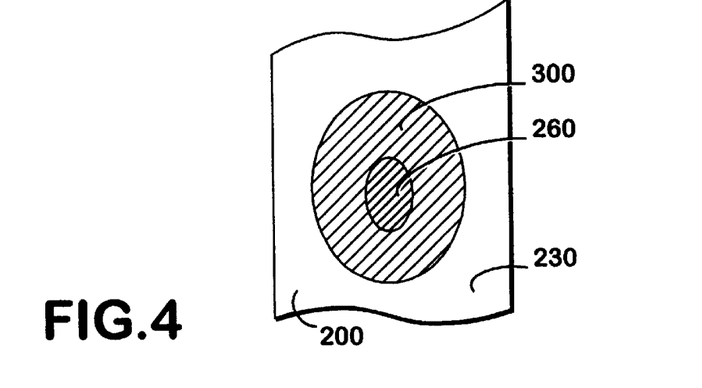
FIG. 4 is a view along line 4—4 of FIG. 3.

FIGS. 3 and 4 show one contact point between the disk 134 and the slider 126. FIG. 3 shows a cutaway end view of the side rail 230 and pad 260 as it engages the disk 134. The disk 134 is provided with a lubricant. The lubricant is placed on the disk to lower the friction between the slider and the disk during contact start/stops. Stiction, also known as static friction, occurs between the disk and the slider. It's a force that tends to keep the slider attached to the disk or in contact with the disk. Head-disk interface stiction arises mainly from menisci formed at contact points between the air-bearing surface 200 of the slider 126 and the disk 134. FIG. 3 shows one of the contact points between the air-bearing surface 200 of the slider 126 and the disk 134. The contact point is the Pad 260. It should be noted that a similar meniscus also forms around contact points or pads 262 and 264. A meniscus 300 is formed around the contact pad 260 between the slider 230 and the disk 134.

As mentioned above, head disk interface stiction arises mainly from menisci formed at contact points between the slider 126 and the disk 134. The magnitude of the stiction force is proportional to the total area of the meniscus 300 formed as well as the pressure within the meniscus 300 which is inversely proportional to the separation distance between the slider 126 and the disk 134. As shown in FIGS. 3 and 4, when the pad 260 is placed in the middle of the slider rail 230, the meniscus 300 develops around the pad 260. In other words, the meniscus 300 forms a full circle which surrounds the pad 260. As a result, the magnitude of the stiction force is proportional to the total area of the circle forming the meniscus 300 less the circle forming the pad 260. The distance between the air-bearing surface 200 and the disk depends upon the thickness of the pad 260.

Figure 5:
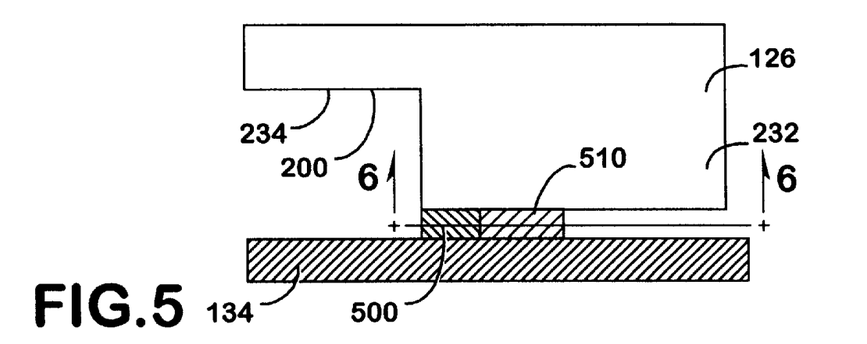
FIG. 5 is a cutaway end view of a side rail of a slider having a pad located near the edge of the side rail.
Figure 6:
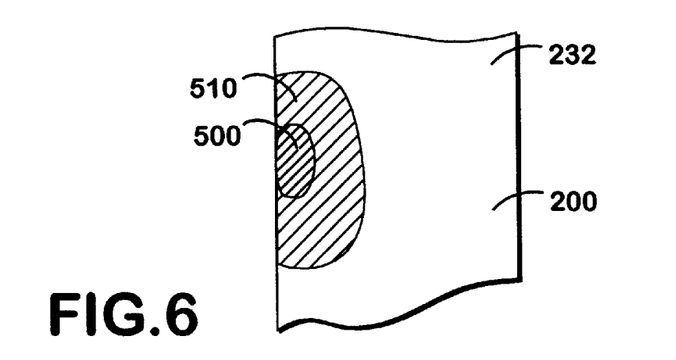
FIG. 6 is a view along line 6—6 of FIG. 5.

FIGS. 5 and 6 show a contact point between a slider 126 and a disk 134 placed on the air bearing surface 200 in accordance with this invention. FIG. 5 is a cutaway end view of a side rail 232 having a pad 500 which is located near the edge of the side rail 232. A meniscus 510 forms around the pad 500. Since the pad 500 is placed near the edge of the side rail 232, the area of the meniscus 510 is lessened since there is no meniscus buildup on one side of the pad 500. That is to say that since the pad 500 is located near the step associated with the cavity 234 of the side rail 232, the meniscus 510 is unable to fully encircle the pad 500. As mentioned before, the stiction force is proportional to the total area of the meniscus. Moving the pad 500 to the edge of the side rail 232 results in a reduction of the area of the meniscus 510. As a result, the forces of stiction are also reduced since stiction is proportional to the area of the meniscus 510. It should also be noted that the area of the meniscus will be dramatically reduced when the pad 500 is placed near the outer edge or the edge formed between the tapered leading edge 250 and the cavity 234.

FIG. 6 is a view of the air-bearing surface 200 in the area of the meniscus 510 and along cutline 6—6 of FIG. 5. As can be seen, the area of the meniscus 510 is greatly reduced since the pad 500 is placed near the edge of the second side rail 232. The reason the meniscus is smaller is that the separation between the air-bearing surface 200 of the slider 126 and the disk 134 is defined either by the cavity 234 depth or the thickness of the second rail 232. It is several orders of magnitude larger than the slider 126 disk 134 separation on the other side of the pad, which is essentially defined as the pad 500 height. The meniscus pressure on the side with the smaller separation is therefore several orders of magnitude more than the pressure on the side of the meniscus associated with the cavity 234. Since inside the meniscus 510, the hydrostatic equilibrium state has to be maintained, the meniscus 510 corresponding to the higher pressure dominates. In other words, the side with the larger spatial relief, thus lower pressure, will not develop a meniscus and, as a result, the area of the meniscus surrounding each pad is reduced by almost half. This reduction in the area of the meniscus leads to lower stiction at the head disk interface.

Figure 7:
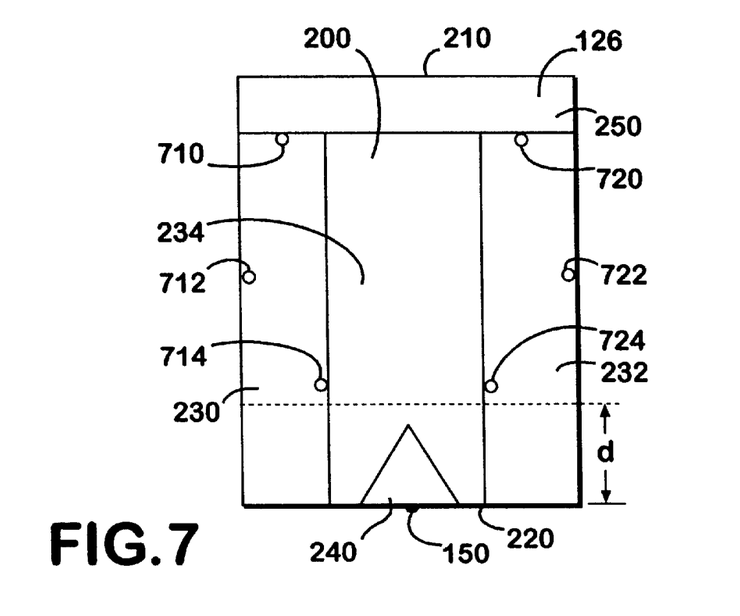
FIG. 7 is a bottom view of the slider which shows the air-bearing surface with pads placed on the side rails.

FIG. 7 is a bottom view of a slider 126 at its air-bearing surface 200 which shows pads placed on the first side rail 230 and the second side rail 232. Pads 710, 712 and 714 are positioned on the first side rail 230. A pad 720, a pad 722, and a pad 724, are positioned along the second side rail 232.

Each of the pads 710, 712, 714, 720, 722, and 724 are positioned along an edge of the first side rail 230 or an edge of the second side rail 232. Pads 710 and 720 are located in the center of the side rail but at the interface between the tapered leading edge 250 and the first side rail 230 and the second side rail 232, respectively. Pads 712 and 722 are located on the outer edge of the first side rail 230 and on the outer edge of the second side rail 232, respectively. Pad 714 and pad 724 are located on the edge of the side rail 230 and 232, respectively, which is near the inner cavity 234 of the air-bearing surface 200. Since the pads 710, 712, 714, 720, 722 and 724 are located on the edge of one of the side rails 230 and 232, the meniscus (not shown in FIG. 7) associated with each of the pads will be smaller in area. As a result, the stiction force that is formed will be less than other air-bearing surfaces with pads that are placed in the middle or not at the edges of the first rail 230 and the second rail 232.

Each of the pads are unaligned along the length of the air bearing surface 200. For example, pads 710, 712 and 714 do not line up with one another along the first side rail 230 of the air-bearing surface 200. Similarly, pads 720, 722 and 724 also do not align along the second side rail 232. During a takeoff and landing of the slider 126, the lubricant on a disk 134 may be removed or pushed aside. This is especially true during multiple contact start/stops, where the head continues to take off and land. To assure the durability of the interface between the slider 126 and the disk 134, the pads are not aligned. This affords reflow of the lubricant in the vicinity of where a pad has passed to repair any damage to the lubricant. In other words, if the pads were aligned, it is conceivable that during a takeoff or a landing, the first pad would remove the lubricant from that area of the disk and then the second and third pads, if aligned, would damage the disk as they would pass over an unlubricated portion of the disk 134.

As a result, the pads 710, 712 and 714 are not aligned so that three separate areas of lubricant are removed and can be reflowed. This provides for a much more durable contact between the slider 126 and the disk 134. Similarly, the pads 720, 722 and 724 are also not aligned so that during a takeoff or landing of the slider 126 onto the disk 134, three separate trenches or grooves of pushed-aside lubricant will be formed. It should be noted that the lubricant will reflow before another revolution of the disk occurs. In other words, if the landing pads are placed such that they align along a straight line on a slider rail, the time available for lube reflow will be very limited and is essentially defined by the distance between two adjacent pads. In the design shown in FIG. 7, the pads 710, 712 and 714 are deliberately misaligned to provide a maximum time for lube reflow which is defined by the entire length of a track on the disk 134.

The pads 714 and 724 are placed at an offset distance d from the trailing edge 220 of the slider 126. The offset distance d is selected so that the distance between the transducer in the center pad 240 and the disk 134 is not affected by the placement of the pads 710, 712, 714, 720, 722 and 724. In other words, the area of the first side rail from the trailing edge up to the offset distance d is not occupied by any pads 710, 712 or 714, and similarly the area on the second side rail 232 between the trailing edge and up to the offset distance d is also not populated by pads 720, 722 or 724. The offset distance is selected so that the pads will not interfere or increase the separation distance between the transducer and the magnetic material on the disk. Simply put, by not affecting the separation distance between the transducing head 150 and the disk, the pads will not affect the magnetic performance of the transducing head 150.

Figure 8:
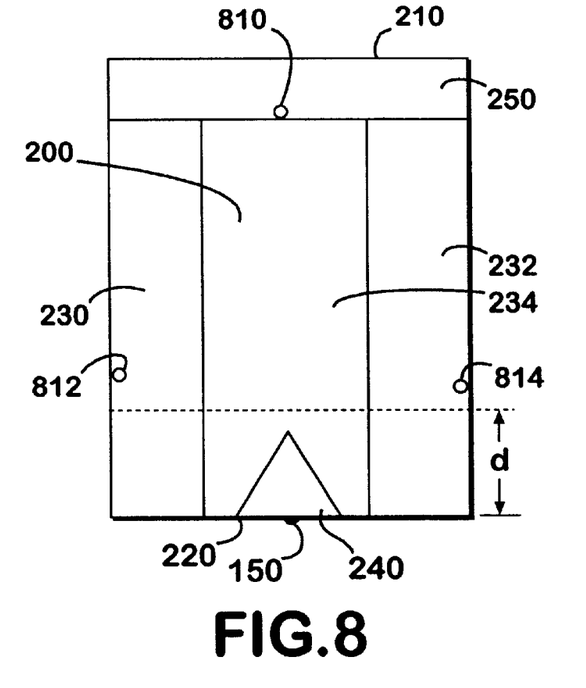
FIG. 8 is a bottom view of the slider which shows the air-bearing surface with pads placed on the side rails and the tapered leading edge.

FIG. 8 is a bottom view of a slider 126 which shows an air-bearing surface 200. The air-bearing surface 200 shown in FIG. 8 is another embodiment of the preferred invention in which a first pad 810 is placed at the edge of the tapered leading edge 250. A second pad 812 is placed on the outside edge of the first side rail 230 and a pad 814 is placed on the outer edge of the second side rail 232. Again, there are no pads 810, 812 or 814 located on the first side rail 230 at an offset distance from the trailing edge 220 of the slider 126. In addition, there is no pad 810, 812 or 814 located between the trailing edge and the offset distance up from the trailing edge on the second side rail 232. By having no pads 810, 812 and 814 located within the offset distance from the trailing edge 220 of the slider 126, the pads 810, 812 and 814 will not interfere with the distance between the transducer 150 and the disk 134.

The pads are also placed so that they do not align to allow for the time of lubricant on the disk to reflow. In addition, the pads are also positioned so that when a slider is skewed with respect to a tangent to the radius at which the slider is positioned, the pads will not align along the track.

Figure 9:
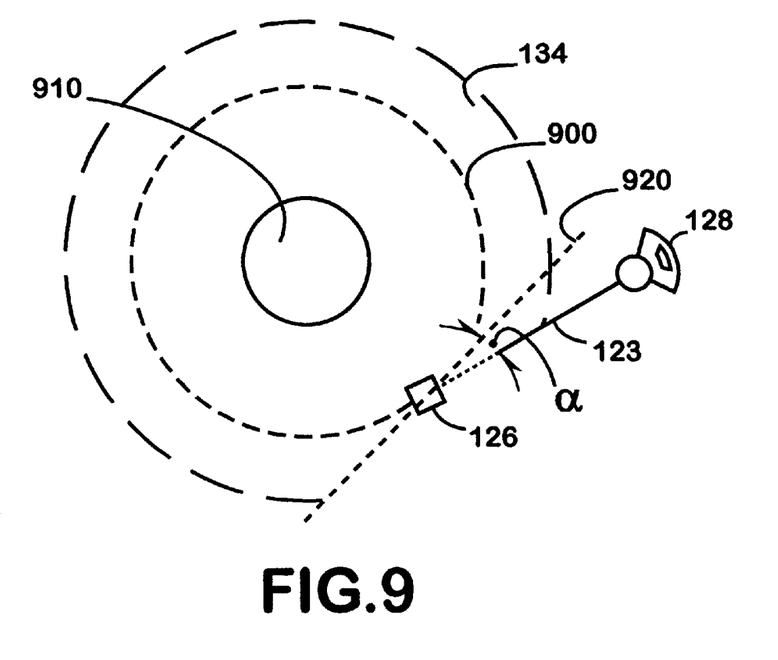
FIG. 9 is a top schematic view of the arm and slider which shows the slider skewed with respect to the tangent to the radius at which the slider is positioned.

FIG. 9 shows a schematic view of an arm 123 with a slider 126 attached thereto. Disk 134 includes a track 900 which is positioned at a radial distance from the center 910 of the disk 134. A tangent to the track 920 is also shown in the vicinity of the slider 126. The tangent 920 is a tangent at the radius from the center 910 of the disk at the radius of the track 900. A skew angle α is the angle between the center line of the arm 123 and the tangent 920 at the radial position of the slider 126. As shown in FIG. 9, the skew angle α is exaggerated for purposes of illustration. The pads 710, 712, 714, 720, 722 and 724 are positioned so that even at a maximum skew angle of the slider with respect to the various tracks on the disk, none of the pads 710, 712, 714, 720, 722 and 724 will be aligned along the track 900. Similarly, pads 810, 812 and 814 are also positioned so that they will not be aligned even at a skew angle α.

It should be noted that a set of pads can be placed on the air-bearing surface 200 of a slider 126 in any configuration in accordance with this invention. It should also be noted that when placed, the pads are positioned near the edge of a side rail or the edge of the tapered leading edge 250.

Advantageously, the pads are placed on the air-bearing surface of the slider to minimized any stiction forces that occur. The placement of the pads produces a slider that minimizes stiction overall between the slider and the disk. The pads do not interfere with the normal operation of the read/write head or transducer associated with the slider since the pads are offset a selected distance from the trailing edge of the slider. The pads are also unaligned in the sliding direction so that the lubricant on the disk can fill in between successive passes of the -slider over a track. The pads are also unaligned in the sliding direction when the slider is skewed with respect to the disk. The end result is a slider that can undergo multiple contact start/stops without failing prematurely. The slider is also easily manufactured using photolithography techniques and the slider is robust and can absorb some of the impact that occurs when the slider lands on the disk.

Figure 10:
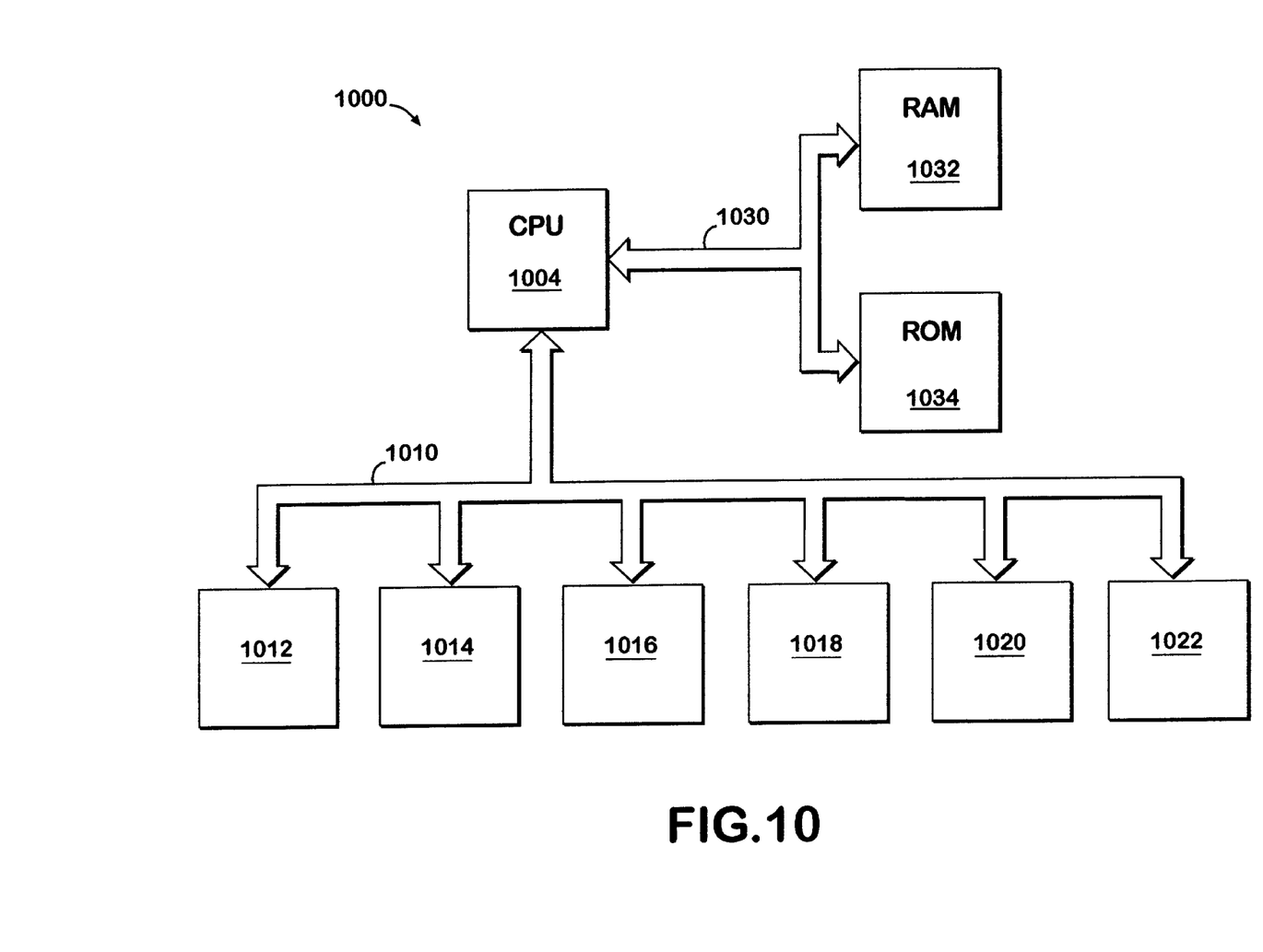
FIG. 10 is a schematic view of a computer system.

FIG. 10 is a schematic view of a computer system. Advantageously, the invention is well-suited for use in a computer system 1000. The computer system 1000 may also be called an electronic system or an information handling system and includes a central processing unit, a memory and a system bus. The information handling system includes a central processing unit 1004, a random access memory 1032, and a system bus 1030 for communicatively coupling the central processing unit 1004 and the random access memory 1032. The information handling system 1002 includes a disk drive device which includes pads placed to minimize stiction as described above. The information handling system 1002 may also include an input/output bus 1010 and several devices peripheral devices, such as 1012, 1014, 1016, 1018, 1020, and 1022 may be attached to the input output bus 1010. Peripheral devices may include hard disk drives, magneto optical drives, floppy disk drives, monitors, keyboards and other such peripherals. Any type of disk drive may use the slider having pads placed to minimize stiction between the air-bearing surface and another surface.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A slider for a magnetic disk drive comprising:
    a block of material which includes an air-bearing surface and a backside surface, the air-bearing surface having at least one rail that extends substantially parallel to a sliding direction of the block of material and that has a planar region; and
    means for minimizing stiction forces formed between the air-bearing surface of said block of material and an other surface including a pad positioned on the air-bearing surface at an edge of the planar region but beyond the planar region such that a fluid meniscus formed around the pad does not fully encircle the pad.

2. The slider for a magnetic disk drive of claim 1 wherein the means for minimizing the stiction forces includes additional pads formed on said air-bearing surface.

3. The slider for a magnetic disk drive of claim 1 wherein the block of material further comprises a first side rail and a second side rail, wherein the means for minimizing the stiction forces includes pads formed on said air-bearing surface and positioned near the edges of the first side rail and the second side rail.

4. A head gimbal assembly for a disk drive comprising:
    a load spring; and
    a slider attached to the load spring, said slider further comprising an air-bearing surface, said air-bearing surface further comprising:
        a first side rail extending substantially parallel to a sliding direction of the slider and having a planar region; and
        a second side rail extending substantially parallel to the sliding direction and having a planar region;
    a first pad positioned near an edge of the first side rail at a side of the planar region of the first side rail but not beyond the planar region of the first side rail such that a first fluid meniscus formed around the first pad does not fully encircle the first pad; and
    a second pad positioned near an edge of the second side rail at a side of the planar region of the second rail but not beyond the planar region of the second side rail such that a second fluid meniscus formed around the second pad does not fully encircle the second pad.

5. The head gimbal assembly of claim 4 wherein the slider further comprises a trailing edge, said first pad positioned at least a selected distance from the trailing edge.

6. The head gimbal assembly of claim 4 wherein the slider further comprises a trailing edge, said first pad positioned at least a selected distance from the trailing edge and said second pad positioned at least a second selected distance from the trailing edge.

7. The head gimbal assembly of claim 4 wherein the slider further comprises a leading edge, said leading edge further comprising a leading edge pad positioned near an edge of the leading edge.

8. The head gimbal assembly of claim 4 wherein the slider further comprises
    a third pad positioned near the edge of the first side rail; and
    a fourth pad positioned near the edge of the second side rail.

9. The head gimbal assembly of claim 8 wherein the slider further comprises a trailing edge, said first, second, third and fourth pads positioned at least a selected distance from the trailing edge.

10. A slider for a disk drive comprising:
    a block of material including an air-bearing surface, said air-bearing surface further comprising:
        a first side rail extending substantially parallel to a sliding direction of the block of material and having a planar region; and a second side rail extending substantially parallel to the sliding direction and having a planar region; a first pad positioned near an edge of the first side rail at a side of the planar region of the first side rail but not extending beyond the planar region of the first side rail such that a first fluid meniscus formed around the first pad does not fully encircle the first pad; and a second pad positioned near an edge of the second side rail at a side of the planar region of the second side rail but not extending beyond the planar region of the second side rail such that a second fluid meniscus formed around the second pad does not fully encircle the second pad.

11. The slider of claim 10 wherein the slider further comprises a trailing edge, said first pad positioned at least a selected distance from the trailing edge.

12. The slider of claim 10 wherein the slider further comprises a trailing edge, said first pad positioned at least a selected distance from the trailing edge and said second pad positioned at least a second selected distance from the trailing edge.

13. The slider of claim 10 wherein the slider further comprises a leading edge, said leading edge further comprising a leading edge pad positioned near an edge of the leading edge.

14. The slider of claim 10 wherein the slider further comprises a third pad positioned near the edge of the first side rail; and
    a fourth pad positioned near the edge of the second side rail.

15. The slider of claim 14 wherein the slider further comprises a trailing edge, said first, second, third and fourth pads positioned at least a selected distance from the trailing edge.

16. An information handling system comprising:
    a base;
    a disk rotatably attached to said base;
    an actuator assembly movably attached to said base, said actuator assembly further comprising:
    a load spring;
    a slider attached to the load spring, said slider further comprising:
    a block of material including an air-bearing surface, said air-bearing surface further comprising:

a first side rail extending substantially parallel to a sliding direction of the block of material; and a second side rail extending substantially parallel to the sliding direction;

a first pad positioned near an edge of the first side rail at a side of a planar region of the first side rail but not extending beyond the planar region of the first side rail such that a first fluid meniscus formed around the first pad does not fully encircle the first pad; and a second pad positioned near the edge of the second side rail at a side of a planar region of the second side rail but not extending beyond the planar region of the second side rail such that a second fluid meniscus formed around the second pad does not fully encircle the second pad; and a transducer attached to said slider, said actuator placing the slider in a transducing position with respect to said disk.

17. The information handling system of claim 16 wherein the slider further comprises:

a third pad positioned near the edge of the first side rail; and a fourth pad positioned near the edge of the second side rail.

18. The information handling system of claim 17 wherein the slider further comprises a trailing edge, said first, second, third and fourth pads positioned at least a selected distance from the trailing edge.

19. The information handling system of claim 17 wherein the slider further comprises a trailing edge, said first and second pads positioned on the first side rail such that they are unaligned in the sliding direction, said third and fourth pads positioned on the second side rail such that they are unaligned in the sliding direction.

20. The information handling system of claim 17 wherein the first side rail and the second side rail form an angle with respect to a tangent at the radial position on the disk, said first, second, third and fourth pads positioned so that they are unaligned in the sliding direction when the first side rail and the second side rail form an angle with respect to a tangent at the radial position on the disk.

* * * * *